3,210,044
CLOSED TYPE AIR TURBINE HAVING AIR BEARINGS

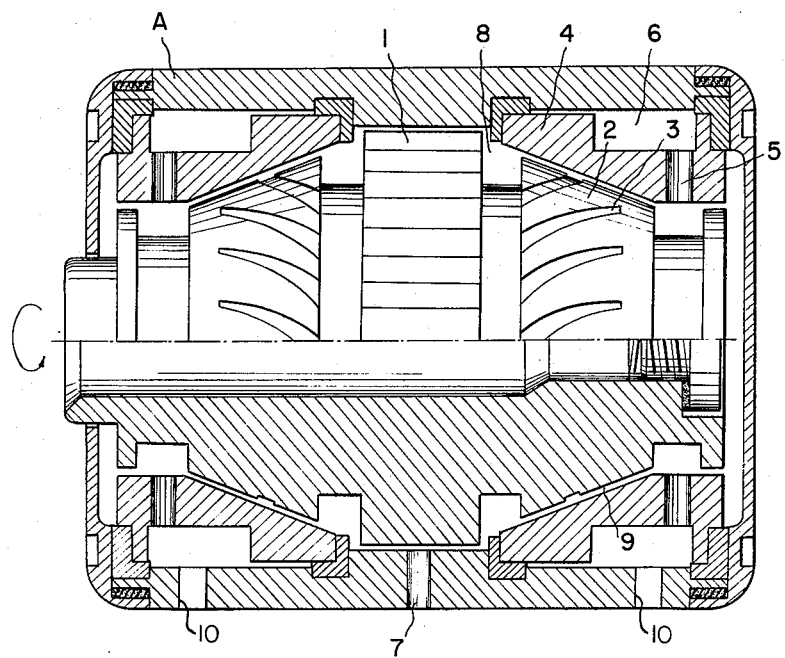

Haruo Mori, Kamikyo-ku, Kyoto-shi, Japan, assignor to Kabushiki Kaisha Morita Seisakusho, Fushimi-ku, Kyoto-shi, Japan, a joint-stock company of Japan
Filed Aug. 22, 1963, Ser. No. 303,780
Claims priority, application Japan, June 19, 1963, 38/32,238
1 Claim. (Cl. 253—2)

The present invention relates to a new and improved closed type air turbine having air bearings.

It is an object of this invention to provide an improved closed type air turbine provided with self-acting air bearings having the characteristics of radial bearings.

It is another object of this invention to provide an improved, closed type air turbine provided with self-acting air bearings the friction of which is made very slight so as to make a very efficient, high speed rotation of the air turbine possible.

The nature and details of the invention will be more clearly apparent by reference to the following description of one representative embodiment of the invention when taken in connection with the accompanying drawing.

The embodiment shown in the drawing comprises an air turbine wheel 1 disposed centrally in an enclosed turbine casing A; two conical rotors 2 which are respectively provided at the opposite end sides of said turbine wheel 1, each of said conical rotors being provided at its surface with a plurality of oblique grooves 3 extending continuously from the rotor end of larger diameter toward the other end and terminating inwardly of the other end, the cross-sectional area of the grooves 3 progressively decreased from the large ends of the rotors 2 toward the smaller ends, conical bearing members 4 which are respectively mounted between the said conical rotors and the turbine casing; and exhaust channels or passages 5 which are made to open to the ambient atmosphere through passages 10 from the inner cavities 6.

Operation and advantages of the air turbine described above will be described hereinafter. The following description relates to the right half in the drawing, but it is applied to the left half in the same manner.

The air injected into the turbine from the turbine nozzle 7 affords a rotation torque to the turbine wheel 1 and then is accumulated in the inner cavity 8 adjacent to the bearing member 4. At the said cavity, the dynamic pressure of injection is partly converted to a static pressure, but can be maintained higher than the atmospheric pressure. The oblique grooves 3 of the conical rotor 2 revolving in unison with the turbine wheel 1 act as a pump, which with the help of the pressure maintained in the inner cavity 8 and the direct flow from the turbine blades, induces air flow from the inner cavity 8 into the grooves 3 with the revolution of the turbine wheel and discharges the induced air into the clearance 9 between the bearing 4 and the rotor 2 in the form of jets to form an air bearing support for the rotor and wheel. In this case, since the oblique grooves 3 terminate inwardly of the end of the bearing and the air passage formed by the clearance 9 of the bearing member 4, by reason of the shape of the conical surface, becomes narrower towards its tapered end, the air forced into the clearance 9 of the bearing member 4 by the oblique grooves 3 is compressed with a resulting decrease in volume, thus producing a pressure in the clearance 9 of the bearing member 4. This pressure decreases at the side with wider clearance because of a lower exit resistance. On the contrary, it increases at the side with less clearance because of a higher exit resistance, whereby at each position of the clearance of the bearing, the pressure is made to decrease and increase, respectively, in accordance with increase and decrease of said clearance, thus providing a suitable characteristic of a radial bearing.

Furthermore, the rightside and leftside conical bearings function against a thrust load so as to prevent contact between the rotors 2 and bearing members 4 by increasing the pressure at a side where the clearance becomes narrower, thus minimizing friction in the clearance between the rotors and bearings by forming a perfect air film in said clearance and establishing an ideal high speed rotation of the air turbine. The air flowing out of the tapered end of the air bearing is led to the ambient atmospheric from the exhaust channel or passage 5 by way of the inner cavity 6 and passages 10, whereby the air inside the turbine does not flow backwardly but constantly flows in one direction.

Although this invention has been described with respect to an embodiment thereof, it is not limited thereto and many changes and modifications may be made within the full intended scope of the invention as defined by the appended claim.

What I claim is:

A closed type air turbine having self-acting air bearings, said turbine comprising a casing, a turbine wheel disposed centrally in said casing, an air intake nozzle in said casing disposed to direct air to said wheel to cause rotation thereof, a pair of conical rotors disposed axially, one on each end of said wheel and connected to said wheel for rotation therewith, the large diameter ends of said rotors being disposed adjacent said wheel and axially spaced therefrom to provide with said casing an annular cavity at each end of said wheel, each rotor having a plurality of oblique grooves in the peripheral surface extending from the ends adjacent said wheel and terminating inwardly of the ends of smaller diameter, the cross-sectional areas of said grooves progressively decreasing from the large ends of said rotors toward the smaller ends, a pair of conical bearing members fixed in said casing and surrounding said rotors in spaced relation thereto, means providing a second annular cavity between each bearing member and said casing, means providing a third annular cavity between the small end of each rotor and the adjacent bearing member, said bearing members having passages communicating with said second and third cavities and said casing having passages communicating with said second cavities and the atmosphere, where air impinging on said wheel will cause rotation of said wheel and rotors, said air flowing into said first cavities and through said grooves, said air being discharged from said grooves in the form of a plurality of jets impinging on the inner surfaces of said bearing members to provide axially spaced fluid bearing supports for said rotors and wheel, said air thereafter flowing into said third cavities, through the passages in said bearing members into said second cavities and through the passages in said casing to the atmosphere.

References Cited by the Examiner
UNITED STATES PATENTS 760,776  5/49  Campbell.
3,128,988  4/64  Mandroian _____ 253—2

FOREIGN PATENTS 610,572  10/48  Great Britain.

KARL J. ALBRECHT, *Primary Examiner.*
JOSEPH H. BRANSON, JR., *Examiner.*